United States Patent
Fukuoka et al.

(10) Patent No.: US 6,685,906 B2
(45) Date of Patent: Feb. 3, 2004

(54) SILICON OXIDE CONTAINING ACTIVE SILICON AND ITS EVALUATION

(75) Inventors: Hirofumi Fukuoka, Annaka (JP); Mikio Aramata, Annaka (JP); Kazutoshi Fujioka, Usui-gun (JP); Susumu Ueno, Annaka (JP); Takeshi Fukuda, Chiyoda-ku (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 531 days.

(21) Appl. No.: 09/773,521

(22) Filed: Feb. 2, 2001

(65) Prior Publication Data

US 2001/0018037 A1 Aug. 30, 2001

(30) Foreign Application Priority Data

Feb. 4, 2000 (JP) .................................. 2000-027837

(51) Int. Cl.7 .............................................. C01B 33/113
(52) U.S. Cl. .................... 423/325; 423/336; 436/72; 436/173
(58) Field of Search ................. 423/325, 335, 423/336; 436/72, 173

(56) References Cited

U.S. PATENT DOCUMENTS 4,959,338 A * 9/1990 Miura et al. ................ 502/263
6,132,594 A * 10/2000 Okazaki et al. ......... 208/111.01

FOREIGN PATENT DOCUMENTS

JP 9-7638 1/1997

OTHER PUBLICATIONS

Ekkehard Fueglein et al., "Formation of $Mg_2Si$ from Solid Silicon Monoxide, and Solid-State Comproportionation between $Mg_2Si$ and SiO," *Chem. Mater.*, vol. 11, pp. 865–866 (1999) No Month.
English abstract of JP 9-7638 Jan. 10, 1997.

* cited by examiner

*Primary Examiner*—Stanley S. Silverman
*Assistant Examiner*—Edward M. Johnson
(74) *Attorney, Agent, or Firm*—Millen, White, Zelano & Branigan, P.C.

(57) ABSTRACT

Silicon oxide containing active silicon represented by the general formula: $SiO_x$ wherein x is from 0.8 to 1.9, when analyzed by solid state NMR (29Si DD/MAS) with a sufficient relaxation time set, exhibits a spectrum having two separate peaks, a broad peak (A1) centered at −70 ppm and a broad peak (A2) centered at −110 ppm, the area ratio A1/A2 being in the range of $0.1 \leq A1/A2 \leq 1.0$.

6 Claims, 3 Drawing Sheets

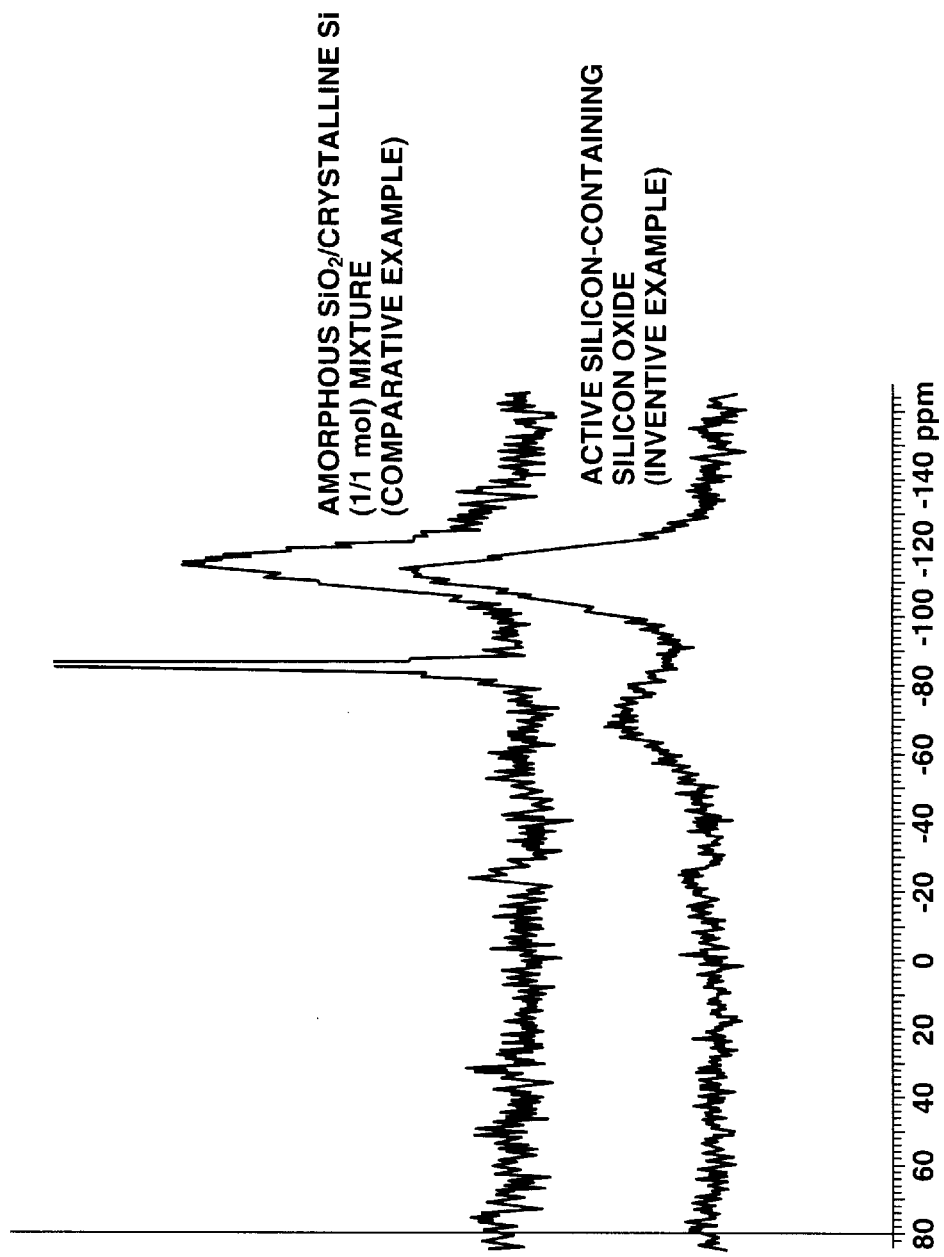

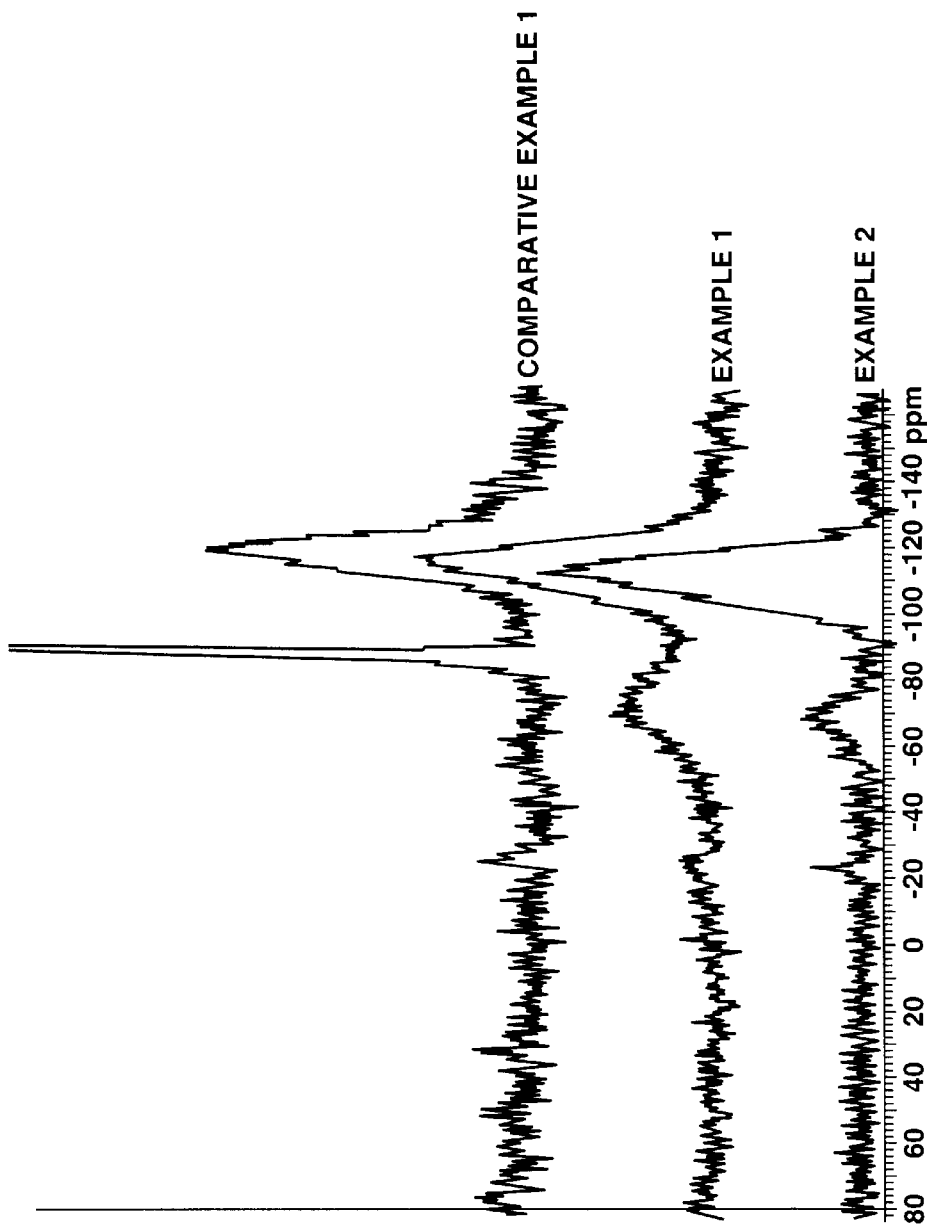

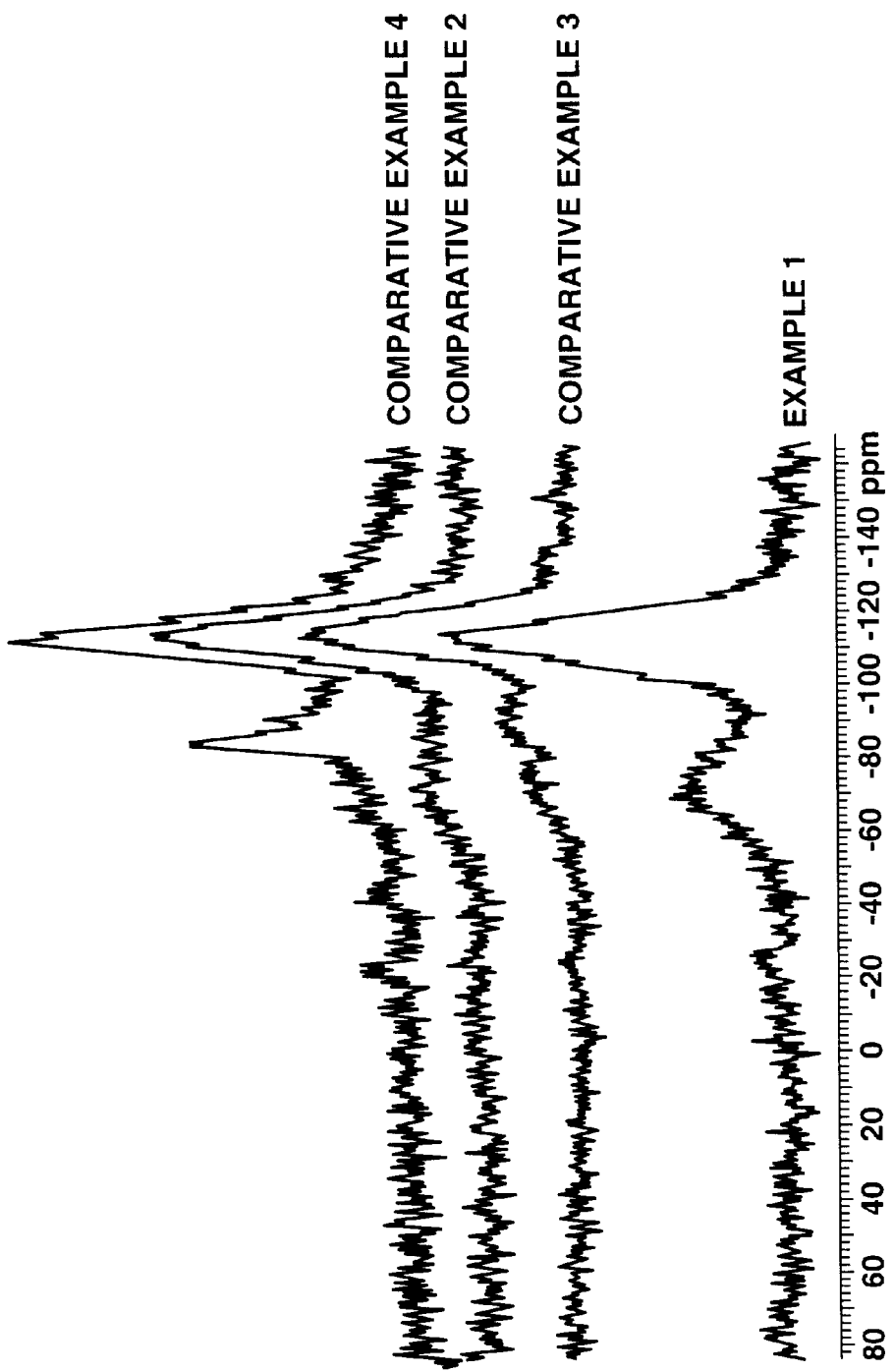

SILICON OXIDE CONTAINING ACTIVE SILICON AND ITS EVALUATION

This invention relates to silicon oxide containing active silicon and a method for evaluating the same.

BACKGROUND OF THE INVENTION

Silicon oxide is well known in the art and generally used as a raw material for the manufacture of ceramics, a raw material for the manufacture of organosilicon compounds, and a negative electrode active material in lithium ion secondary batteries. By taking advantage of its chemical activity, silicon oxide is used in the synthesis of industrially useful alkylhalosilanes (Gary N. Bokerman et al., U.S. Pat. No. 5,051,247) and the direct synthesis of siloxanes (Peter L. Timms and William N. Rowlands, EPA 0406000A2). It is reported in E. Fuglein and U. Schubert, Chem. Mater., 1999, 11, 865–866 that silicon oxide is reacted with magnesium at low temperature to produce magnesium silicide. JP-A 9-7638 discloses that using SiOx as a negative electrode active material in lithium ion secondary batteries facilitates occlusion and release of lithium ions. The use of silicon oxide as the lithium ion secondary battery negative electrode active material is expected to expand in the near future.

A need exists for silicon oxide finding effective use in these applications.

SUMMARY OF THE INVENTION

An object of the invention is to provide silicon oxide containing active silicon which finds effective use in the above-mentioned applications and a method for evaluating the same.

We produced samples of active silicon-containing silicon oxide under different conditions and analyzed them for evaluation. We have found from the results of measurement by solid state NMR (29Si DD/MAS) that active silicon-containing silicon oxide, in which two peaks of specific chemical shifts appear definitely separated and the area ratio of these peaks is within a specific range, achieves the above object because it is more reactive with other elements when used in the above-mentioned applications. Whether or not a silicon oxide sample is appropriate can be judged by this method.

In one aspect, the invention provides silicon oxide containing active silicon represented by the general formula: SiOx wherein x is from 0.8 to 1.9. On analysis by solid state NMR (29Si DD/MAS) with a sufficient relaxation time set, the silicon oxide exhibits a spectrum having two separate peaks, a broad peak (A1) centered at −70 ppm and a broad peak (A2) centered at −110 ppm. The area ratio A1/A2 of these peaks is in the range of $0.1 \leq A1/A2 \leq 1.0$.

In another aspect, the invention provides a method for evaluating silicon oxide, comprising the steps of analyzing silicon oxide by solid state NMR (29Si DD/MAS) with a sufficient relaxation time set; and judging the silicon oxide to be silicon oxide containing active silicon when the measured spectrum has a broad peak (A1) centered at −70 ppm and a broad peak (A2) centered at −110 ppm, the area ratio A1/A2 being in the range of $0.1 \leq A1/A2 \leq 1.0$.

BRIEF DESCRIPTION OF THE DRAWINGS

FIG. 1 is a diagram showing solid state NMR spectra of silicon oxide according to the invention and a $SiO_2$/Si mixture in a comparative example.

FIG. 2 is a diagram showing solid state NMR spectra of Examples 1 and 2 and Comparative Example 1.

FIG. 3 is a diagram showing solid state NMR spectra of Example 1 and Comparative Examples 2 to 4.

DESCRIPTION OF THE PREFERRED EMBODIMENT

On analysis by solid state NMR (29Si DD/MAS) of the silicon oxide containing active silicon according to the invention, the measured spectrum has two definitely separate peaks, a broad peak (A1) centered at −70 ppm and a broad peak (A2) centered at −110 ppm. The area ratio A1/A2 should fall in the range of $0.1 \leq A1/A2 \leq 1.0$, preferably $0.15 \leq A1/A2 \leq 0.9$, and more preferably $0.2 \leq A1/A2 \leq 0.8$. In general, on analysis of the relevant inorganic compound by solid state NMR, a long relaxation time must be set. The NMR analysis herein prefers to set a relaxation time of at least 100 seconds, and more preferably at least 500 seconds. The upper limit of relaxation time is not critical although it is usually 3,600 seconds or less. A typical spectrum of active silicon-containing silicon oxide as measured under such conditions is shown in FIG. 1 together with a spectrum of a comparative mixture of amorphous silicon dioxide and crystalline metal silicon in a molar ratio of 1/1. It is appreciated from the chemical shift of each peak and the measured oxygen content that the broad peak centered at −110 ppm is assigned to tetravalent silicon ($SiO_2$) and the broad peak centered at −70 ppm is assigned to atomic or zero-valent silicon. When zero-valent silicon is not fully dispersed in the atomic state, but exists in blocks, a broad peak appears in proximity to −85 ppm. As crystallization proceeds, a sharp spectral axis appears in proximity to −84 ppm. On x-ray diffraction analysis of such a sample, the diffraction lines of crystalline silicon appear.

It is noted that the area of the broad peak centered at −70 ppm is approximately the area between −50 ppm and −80 ppm, and the area of the broad peak centered at −110 ppm is approximately the area between −90 ppm and −130 ppm.

The active silicon-containing silicon oxide according to the invention is represented by the general formula: SiOx wherein x is from 0.8 to 1.9. If x is less than 0.8, undesirably metallic silicon becomes substantially excessive so that the silicon oxide becomes crystalline and/or block-like and lacks active silicon. If x is more than 1.9, undesirably the silicon oxide becomes substantially silicon dioxide and lacks active silicon. Preferably x is from 0.8 to 1.6, and more preferably from 0.9 to 1.3.

On analysis by an oxygen-in-ceramic analyzer based on the inert gas fusion method, the active silicon-containing silicon oxide should preferably have an oxygen content of 32 to 50% by weight.

On x-ray diffraction analysis, the active silicon-containing silicon oxide should preferably exhibit no definite diffraction lines. The development of definite diffraction lines on x-ray diffraction analysis is undesirable because the activity of silicon is noticeably impeded.

The active silicon-containing silicon oxide should preferably have a BET specific surface area of 0.5 to 200 $m^2/g$. If the surface area is less than 0.5 $m^2/g$, the silicon oxide may have a reduced apparent activity. If the surface area is more than 200 $m^2/g$, the silicon oxide may lose stability and become awkward to work with. The more preferred range of BET specific surface area is from 1.0 to 100 $m^2/g$.

For producing the active silicon-containing silicon oxide, several methods are employable, for example, a method of partially oxidizing silicon, a method of partially reducing silicon dioxide, a method of mixing silicon with silicon dioxide on a physically atomic level, known as mechanofusion method, a method of co-melting silicon and silicon dioxide, followed by quenching, and a method of cooling silicon oxide gas. Preferred is the last-mentioned method of cooling silicon oxide in a gas phase.

A silicon oxide sample obtained by such a method, especially silicon oxide represented by the general formula: SiOx wherein x is from 0.8 to 1.9 is analyzed by solid state NMR (29Si DD/MAS) with a sufficient relaxation time set. When the measured spectrum has a broad peak (A1) centered at −70 ppm and a broad peak (A2) centered at −110 ppm, the area ratio A1/A2 being in the range of $0.1 \leq A1/A2 \leq 1.0$, this silicon oxide sample is judged to be silicon oxide containing active silicon.

EXAMPLE

Examples of the invention are given below by way of illustration and not by way of limitation.

Example 1

A mixture of metallic silicon powder and amorphous silicon dioxide powder in a molar ratio of 1/1 was heated at 1,400° C. in a reduced pressure atmosphere of 0.1 Torr, to produce a silicon oxide vapor. The silicon oxide vapor was cooled in a zone at a temperature of 300° C. where silicon oxide deposited. A sample of the silicon oxide deposit was examined by solid state NMR (29Si DD/MAS) analysis, oxygen content measurement and BET measurement. The solid state NMR spectrum is shown in FIGS. 2 and 3. The spectrum had two definitely separate peaks, a peak at −70 ppm and a peak at −110 ppm, and the peak area ratio A1/A2 was calculated to be 0.60. It was an amorphous silicon oxide powder represented by the general formula: SiOx wherein x is equal to 1.0, having an oxygen content of 36.2 wt % and a BET specific surface area of 35.6 m$^2$/g, and exhibiting no peaks on x-ray diffraction analysis. The relaxation time of solid state NMR measurement was set to 3,600 seconds.

Next, 10 g of the silicon oxide powder was heated at 1,100° C. in nitrogen gas and held at the temperature for 3 hours, producing a silicon nitride powder. This silicon nitride powder had a high degree of conversion and a nitrogen content of 37.6 wt %.

Example 2

A silicon oxide powder was produced under the same conditions as in Example 1 except that the deposition temperature was 400° C. The solid state NMR spectrum of this silicon oxide is also shown in FIG. 2. The spectrum had two definitely separate peaks, a peak at −70 ppm and a peak at −110 ppm, and the peak area ratio A1/A2 was calculated to be 0.18. It was an amorphous silicon oxide powder represented by the general formula: SiOx wherein x is equal to 1.45, having an oxygen content of 45.2 wt % and a BET specific surface area of 77.3 m$^2$/g, and exhibiting no peaks on x-ray diffraction analysis. Nitriding reaction was effected on the silicon oxide powder under the same conditions as in Example 1, producing a silicon nitride powder which had a high degree of conversion and a nitrogen content of 34.7 wt %.

Comparative Example 1

Using a mixture of metallic silicon powder and amorphous silicon dioxide powder in a molar ratio of 1/1, silicon nitride was produced under the same nitriding conditions as in Example 1. The solid state NMR spectrum of the mixture is also shown in FIG. 2. The spectrum had a peak at −84 ppm assigned to crystalline Si and a peak at −110 ppm assigned to amorphous SiO$_2$. The oxygen content was 36.8 wt % and the BET specific surface area was 112 m$^2$/g. This is represented by the general formula: SiOx wherein x is equal to 1.02. The resulting nitride product had been little nitrided as demonstrated by a nitrogen content of 0.3 wt %.

Comparative Example 2

A silicon oxide powder was produced under the same conditions as in Example 1 except that the deposition temperature was 900° C. The solid state NMR spectrum of this silicon oxide is also shown in FIG. 3. The spectrum had moderate peaks between −70 ppm and −100 ppm and a peak at −110 ppm, but these peaks were not definitely separated. It was a silicon oxide powder represented by the general formula: SiOx wherein x is equal to 1.86, having an oxygen content of 51.5 wt % and a BET specific surface area of 110 m$^2$/g. Nitriding reaction was effected on the silicon oxide powder under the same conditions as in Example 1, yielding a nitride product which apparently contained much unreacted matter as demonstrated by a nitrogen content of 5.8 wt %.

Comparative Example 3

A silicon oxide powder was produced under the same conditions as in Example 1 except that the deposition temperature was 1,100° C. The solid state NMR spectrum of this silicon oxide is also shown in FIG. 3. The spectrum had three separate peaks at −70 ppm, −90 ppm and −110 ppm. It was a silicon oxide powder represented by the general formula: SiOx wherein x is equal to 1.45, having an oxygen content of 45.3 wt % and a BET specific surface area of 12.5 m$^2$/g. Nitriding reaction was effected on the silicon oxide powder under the same conditions as in Example 1, yielding a nitride product which apparently contained much unreacted matter as demonstrated by a nitrogen content of 12.3 wt %.

Comparative Example 4

A silicon oxide powder was produced under the same conditions as in Example 1 except that the deposition temperature was 1,200° C. The solid state NMR spectrum of this silicon oxide is also shown in FIG. 3. The spectrum had a peak at −84 ppm (assigned to crystalline Si) and a separate peak at −110 ppm. It was a silicon oxide powder represented by the general formula: SiOx wherein x is equal to 0.99, having an oxygen content of 36.0 wt % and a BET specific surface area of 2.5 m$^2$/g. Nitriding reaction was effected on the silicon oxide powder under the same conditions as in Example 1, yielding a nitride product which apparently contained much unreacted matter as demonstrated by a nitrogen content of 10.6 wt %.

According to the invention, the physical properties of active silicon-containing silicon oxide demanded in the market are revealed and the method of measurement thereof is established. The invention gives a guideline for the future manufacture of active silicon-containing silicon oxide. In addition, using the active silicon-containing silicon oxide in reaction with another element, any desired silicon compound can be effectively and readily produced.

Japanese Patent Application No. 2000-027837 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. Silicon oxide containing active silicon represented by the general formula: SiOx wherein x is from 0.8 to 1.9 which on analysis by solid state NMR (29Si DD/MAS) with a sufficient relaxation time set, exhibits a spectrum having two separate peaks, a broad peak (A1) centered at −70 ppm and a broad peak (A2) centered at −110 ppm, the area ratio A1/A2 being in the range of $0.1 \leq A1/A2 \leq 1.0$.

2. The silicon oxide of claim 1 which on analysis by an oxygen-in-ceramic analyzer based on the inert gas fusion method, has an oxygen content of 32 to 50% by weight.

3. The silicon oxide of claim 1 which exhibits no definite diffraction lines on x-ray diffraction analysis.

4. The silicon oxide of claim 1 which has a BET specific surface area of 0.5 to 200 $m^2/g$.

5. A method for evaluating silicon oxide, comprising the steps of:

analyzing silicon oxide by solid state NMR (29Si DD/MAS) with a sufficient relaxation time set, and judging the silicon oxide to be silicon oxide containing active silicon when the measured spectrum has a broad peak (A1) centered at −70 ppm and a broad peak (A2) centered at −110 ppm, the area ratio A1/A2 being in the range of $0.1 \leq A1/A2 \leq 1.0$.

6. The method of claim 5 wherein the silicon oxide to be evaluated is represented by the general formula: SiOx wherein x is from 0.8 to 1.9.

* * * * *